(12) United States Patent
Grimsrud et al.

(10) Patent No.: US 9,141,299 B2
(45) Date of Patent: Sep. 22, 2015

(54) METHOD FOR REDUCING POWER CONSUMPTION IN SOLID-STATE STORAGE DEVICE

(71) Applicant: Intel Corporation, Santa Clara, CA (US)

(72) Inventors: Knut S. Grimsrud, Forest Grove, OR (US); Jawad B. Khan, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 13/803,153

(22) Filed: Mar. 14, 2013

(65) Prior Publication Data
US 2014/0281599 A1    Sep. 18, 2014

(51) Int. Cl.
*G06F 1/32* (2006.01)
*G06F 3/06* (2006.01)

(52) U.S. Cl.
CPC ............ *G06F 3/0625* (2013.01); *G06F 1/3206* (2013.01); *G06F 1/3275* (2013.01); *G06F 1/3287* (2013.01); *G06F 3/0634* (2013.01); *G06F 3/0679* (2013.01)

(58) Field of Classification Search
CPC ....... G06F 1/32; G06F 1/3275; G06F 1/3287; G06F 3/0625
USPC .................................. 713/320, 324; 365/226
See application file for complete search history.

(56) References Cited

U.S. PATENT DOCUMENTS

| 7,149,130 | B2 * | 12/2006 | Lee ........................... 365/185.33 |
| 8,195,971 | B2 * | 6/2012 | Jiang .............................. 713/324 |
| 8,219,837 | B2 | 7/2012 | Igari |
| 8,245,061 | B2 | 8/2012 | Rauschmayer et al. |
| 8,386,818 | B2 * | 2/2013 | Hong ............................. 713/320 |
| 8,443,221 | B2 * | 5/2013 | Kagan et al. ................... 713/323 |
| 8,531,880 | B2 * | 9/2013 | Rao ........................... 365/185.08 |
| 9,009,407 | B2 * | 4/2015 | Sauber et al. .................. 711/118 |
| 2007/0094454 | A1 * | 4/2007 | Brundula et al. ............. 711/154 |
| 2012/0102268 | A1 * | 4/2012 | Smith et al. ................... 711/113 |
| 2013/0138868 | A1 * | 5/2013 | Seroff et al. ................... 711/103 |

OTHER PUBLICATIONS

Micron Technology, Inc., "2, 4, 8Gb: x8/x16 Multiplexed NAND Flash Memory Command Definitions", pp. 22-36, 2004.

* cited by examiner

Primary Examiner — Chun Cao
(74) Attorney, Agent, or Firm — Chapin IP Law, LLC

(57) ABSTRACT

Apparatus and methods of reducing power consumption in solid-state storage devices such as solid-state disks (SSDs) that can reduce idle power levels in an SSD, while maintaining low resume latency upon exiting a reduced power state. By arranging a storage controller and at least one NAND flash package of the SSD in separate power islands, storing context information for the SSD in at least one page buffer of NAND flash memory within the NAND flash package on one power island upon entering the reduced power state, and, once the context information is stored in the page buffer, allowing the NAND flash memory to enter a standby mode, placing the storage controller on the other power island in a predefined low power mode, and removing power from any unneeded components on the same power island as the storage controller, a scalable approach to reducing idle power levels in the SSD can be achieved.

20 Claims, 6 Drawing Sheets

METHOD FOR REDUCING POWER CONSUMPTION IN SOLID-STATE STORAGE DEVICE

BACKGROUND

Solid-state storage devices such as solid-state disks (SSDs) have been increasingly employed in laptop and tablet computers, as well as computerized devices such as smartphones. A typical SSD includes a non-volatile storage medium such as NAND or NOR flash memory for storing digital information in an array of memory cells. Because the digital information is stored in the non-volatile NAND/NOR flash memory of the SSD, it can persist in the computer system/computerized device even if power is lost to the SSD. After power is restored to the SSD, a host computer within the system/device can access the digital information from the SSD.

Due in no small part to the widespread use of SSDs in laptop and tablet computers as well as smartphones, techniques for reducing power consumption in SSDs have gained increased attention in recent years. One goal of such techniques is to reduce idle power levels in the SSDs. To achieve such reduced idle power levels, some conventional computer systems, computerized devices, and/or SSD subsystems have been configured to remove power from all unneeded components of an SSD as the SSD enters a reduced power state, such as the known "Partial", "Slumber", or "DevSleep" reduced power state. To maintain low resume latency as the SSD exits its reduced power state, some conventional computer systems, computerized devices, and/or SSD subsystems have been further configured to store context information for the SSD (e.g., information pertaining to media encryption keys used for storage devices that perform encryption, etc.) in memory that has a power source distinct from that of the SSD. For example, some conventional computer systems, computerized devices, and/or SSD subsystems have been configured to store such context information for an SSD in volatile static random access memory (SRAM) within a storage controller of the SSD, or in an off-chip SRAM or dynamic random access memory (DRAM).

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings:

FIG. 2b is a timing diagram illustrating an exemplary read command op-code sequence that may be employed by the solid-state storage device of FIG. 1 for reading context information from the page buffer of FIG. 2a;

FIG. 3b is a flow diagram illustrating a further exemplary method of operating the solid-state storage device of FIG. 1, upon exiting the reduced power state of FIG. 3a.

DETAILED DESCRIPTION

Figure 1:
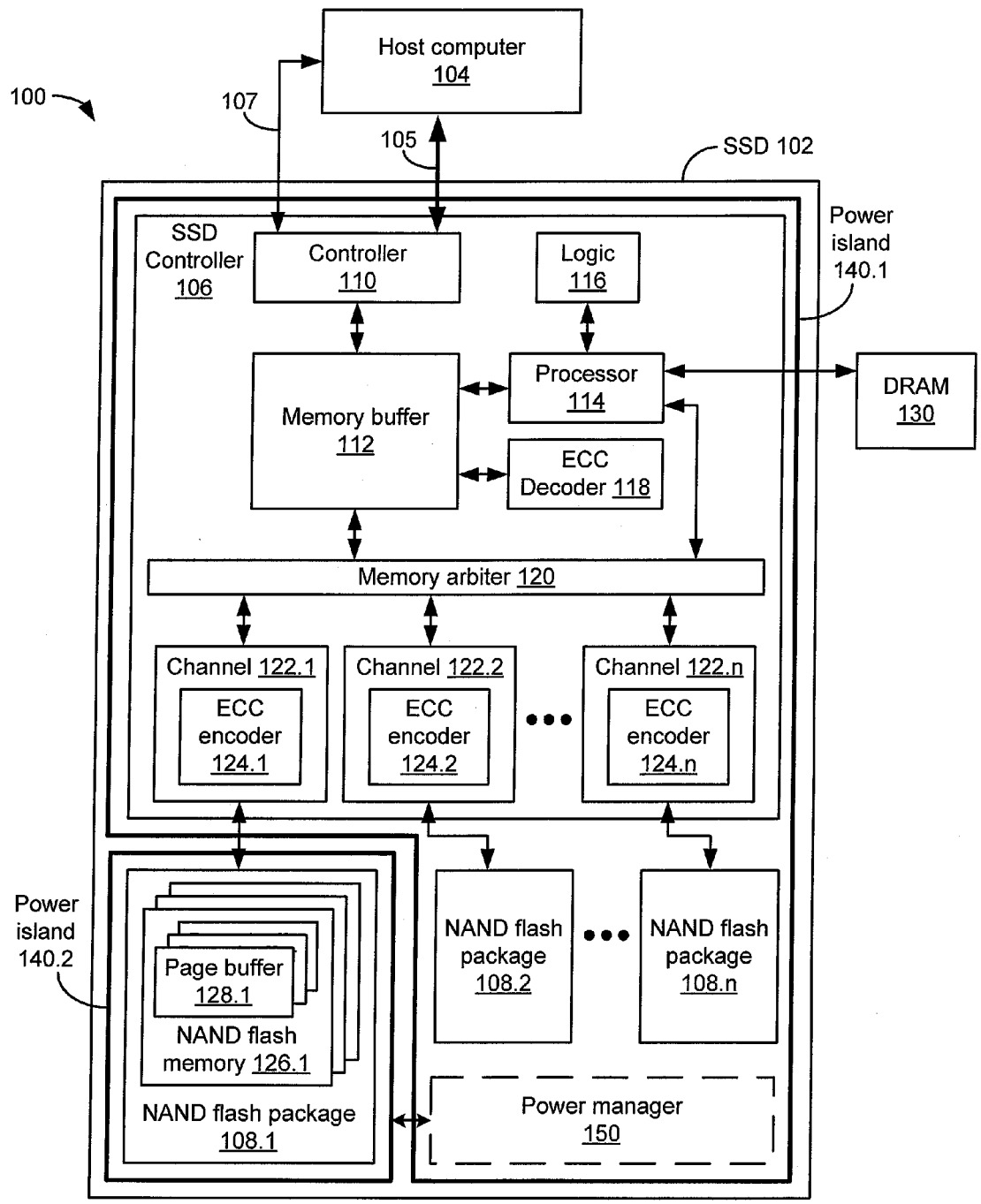
FIG. 1 is a block diagram of an exemplary computer system including an exemplary solid-state storage device configured for reduced power consumption, in accordance with the present application.

Apparatus and methods of reducing power consumption in solid-state storage devices are disclosed that can reduce idle power levels in the solid-state storage devices, while maintaining low resume latency upon exiting a reduced power state. In one embodiment, the disclosed apparatus is a solid-state storage device that includes a storage controller and a plurality of non-volatile memory packages. For example, the solid-state storage device can be a solid-state disk (SSD), or any other suitable storage device. Further, the non-volatile memory packages can include NAND flash memory, NOR flash memory, ferroelectric random access memory (Fe-TRAM), nanowire-based non-volatile memory, three-dimensional (3D) cross point memory such as phase change memory (PCM), memory that incorporates memristor technology, magnetoresistive random-access memory (MRAM), spin transfer torque (STT)-MRAM, or any other suitable non-volatile memory. The storage controller includes a memory buffer, such as a volatile static random access memory (SRAM) buffer, for storing digital information, including context information for the SSD, during normal operation of the SSD. The storage controller and the NAND flash memory packages (also referred to herein as "NAND flash packages") are arranged in a plurality of power islands, such that the storage controller and zero, one, or more of the NAND flash packages are associated with a first power island, and at least one of the NAND flash packages is associated with a second power island separate from the first power island. The NAND flash packages each include NAND flash memory that can be configured to store the digital information in arrays of memory cells organized into one or more pages.

Upon entering the reduced power state of the SSD, the storage controller on the first power island transfers the context information for the SSD to a storage buffer associated with at least one page (also referred to herein as the "page buffer") of the NAND flash memory within the NAND flash package on the second power island. It is noted that the storage controller can transfer such context information for the SSD from its SRAM buffer, other SRAM or dynamic random access memory (DRAM) internal or external to the storage controller, one or more registers internal or external to the storage controller, and/or any other suitable memory, register, or storage location internal or external to the storage controller. It is further noted that such context information for the SSD can include computed values that are generated as part of the transition to low power operation. Once the context information is stored in the page buffer, the NAND flash memory within the NAND flash package on the second power island is allowed to enter a standby mode, the storage controller on the first power island is placed in a predefined low power mode, and power is removed from the zero, one, or more NAND flash packages as well as any other unneeded components on the first power island.

Upon detection of a wakeup condition or reapplication of power to the components on the first power island, the storage controller exits its predefined low power mode, power is reapplied to the zero, one, or more NAND flash packages as well as any other components on the first power island, and the NAND flash memory within the NAND flash package on the second power island exits its standby mode. The storage controller then reads the context information for the SSD from the page buffer, restores and/or updates the context information in a system initialization process, as required, and stores the context information in its SRAM buffer, and/or any other suitable memory, register, or storage location internal or external to the storage controller, to resume normal operation of the SSD.

By arranging a storage controller and at least one NAND flash package of an SSD in separate power islands, storing context information for the SSD in at least one page buffer of NAND flash memory within the NAND flash package on one power island upon entering a reduced power state, and, once the context information is stored in the page buffer, allowing the NAND flash memory to enter a standby mode, placing the storage controller on the other power island in a predefined low power mode, and removing power from any unneeded components on the same power island as the storage controller, a scalable approach to reducing idle power levels (e.g., 2 milliwatts or less) in the SSD can be achieved.

FIG. 1 depicts an illustrative embodiment of a computer system 100 that includes an exemplary SSD 102 configured for reduced power consumption, in accordance with the present application. As shown in FIG. 1, the computer system 100 includes a host computer 104 communicably coupled to the SSD 102 by a system bus 105 as well as an optional line 107. For example, the host computer 104 may employ the system bus 105 for transferring digital information, such as data, computer-executable instructions, applications, etc., between the host computer 104 and the SSD 102, and for performing in-band signaling with the SSD 102. Further, the host computer 104 may employ the optional line 107 for performing out-of-band signaling with the SSD 102. The SSD 102 includes a storage controller 106 (also referred to herein as the "SSD controller"), a plurality of NAND flash packages 108.1-108.n, and a power manager 150. It is noted that the power manager 150 can be implemented either internal or external to the SSD controller 106. The SSD controller 106 includes a controller 110 communicably coupled to the system bus 105 and the optional line 107, a memory buffer 112, a processor 114, control logic circuitry 116, an error checking and correction (ECC) decoder 118, a memory arbiter 120, and a plurality of channels 122.1-122.n communicably coupled between the memory arbiter 120 and the plurality of NAND flash packages 108.1-108.n, respectively. The plurality of channels 122.1-122.n include a plurality of ECC encoders 124.1-124.n, respectively. It is noted that the SSD controller 106 can alternatively include a single ECC encoder that may be employed in conjunction with the respective channels 122.1-122.n. The computer system 100 can further include an off-chip dynamic random access memory (DRAM) 130 communicably coupled to the processor 114 within the SSD controller 106.

In one embodiment, the memory buffer 112 can be implemented using a volatile SRAM, or any other suitable volatile memory, for at least temporarily storing digital information (e.g., the data, computer-executable instructions, applications, etc.) as well as context information for the SSD 102. Further, the processor 114 can be configured to execute at least one program out of at least one memory to allow the memory arbiter 120 to direct the information from the memory buffer 112 to the NAND flash memory within the NAND flash packages 108.1-108.n via the channels 122.1-122.n, respectively. Using in-band signaling over the system bus 105, the controller 110 can receive commands issued by the host computer 104 for writing/reading the information to/from the NAND flash memory within the NAND flash packages 108.1-108.n. Moreover, the ECC encoders 124.1-124.n within the respective channels 122.1-122.n can each encode the information to provide a desired level of ECC before it is stored in the NAND flash memory within the NAND flash packages 108.1-108.n. The ECC decoder 118 can subsequently decode the information read from the NAND flash memory, check ECC parity for any data errors, and, if any such data errors exist, correct the data errors before at least temporarily storing the information in the memory buffer 112 of the SSD controller 106.

It is noted that the plurality of NAND flash packages 108.1-108.n can each include one or more NAND flash memory dice, in which each NAND flash memory die can include NAND flash memory configured to store digital information in one or more arrays of memory cells organized into one or more pages. As shown in FIG. 1, the NAND flash package 108.1 includes one or more NAND flash memory dice 126.1-126.m. Further, the NAND flash memory dice 126.1-126.m each include at least one page buffer associated with at least one page of NAND flash memory. For example, the NAND flash packages 108.1-108.n may each include four, eight, or any other suitable number of NAND flash memory dice, and the NAND flash memory dice may each include one or more page buffers. Further, the page buffers may each store 16 kilobytes, 32 kilobytes, or any other suitable amount of information. It is noted that FIG. 1 depicts only the NAND flash memory dice 126.1-126.m within the NAND flash package 108.1, and one or more page buffers 128.1-128.p on the NAND flash memory die 126.1, for clarity of illustration. For example, the NAND flash packages 108.1-108.n may be implemented using the NAND Flash Memory MT29F2G08AACWP, MT29F4G08BACWP, MT29F8G08FACWP (also referred to herein as the "Micron NAND flash memory") sold by Micron Technology, Inc., Boise, Id., United States, or any other suitable NAND flash memory.

As shown in FIG. 1, the SSD controller 106 and the NAND flash packages 108.1-108.n are arranged in a plurality of power "islands" or areas where at least one subset of components and/or circuitry within the SSD 102 share a common power source that is distinct from at least one other area of components and/or circuitry within the SSD 102. With reference to FIG. 1, the SSD controller 106 and the NAND flash packages 108.2-108.n are associated with a first power island 140.1, and the NAND flash package 108.1 is associated with a second power island 140.2, such that the SSD controller 106 and the NAND flash packages 108.2-108.n on the first power island 140.1 share a common power source that is distinct from that of the NAND flash package 108.1 on the second power island 140.2. In one embodiment, the SSD controller 106 and the plurality of NAND flash packages 108.1-108.n can be configured and arranged such that they can each receive power from the same power supply, but power to the components/circuitry associated with the respective power islands 140.1, 140.2 can be separately enabled and/or disabled by the power manager 150.

The disclosed apparatus for reducing power consumption in solid-state storage devices will be further understood with reference to the following illustrative example, and FIG. 1. In this example, the host computer 104 enables the SSD 102 to enter a predetermined reduced power state using, e.g., at least the ATA SET FEATURES command, as defined in *Serial Advanced Technology Attachment (SATA) International Organization: Serial ATA Revision 3.0, Jun. 2, 2009, Gold Revision*, or latest revision (also referred to herein as the "SATA specification"), or any other suitable command. For example, the predetermined reduced power state of the SSD 102 may correspond to the known "Partial", "Slumber", or "DevSleep" reduced power state, or any other suitable reduced power state. The Partial and Slumber reduced power states are defined in the SATA specification, and the DevSleep reduced power state is defined in *Serial ATA Technical Proposal: SATA*31_*TPR*_*C*108, *Device Sleep, Revision* 1.0*a*, *Oct*. 24, 2011, or latest revision (also referred to herein as the "Device Sleep specification").

At a time when there are no other commands outstanding, the host computer 104 can transmit at least the ATA SET FEATURES command to the SSD 102 over the system bus 105, using in-band signaling. The controller 110 receives the ATA SET FEATURES command from the host computer 104, and executes the command to enable the SSD 102 to enter the predetermined reduced power state. It is noted that the SSD 102 can alternatively enter the predetermined reduced power state on its own accord. After a period of device idleness, or at any other suitable time, the host computer 104 asserts, to the controller 110, a predetermined command signal to direct the SSD 102 to enter the predetermined reduced power state. For example, in the event the predetermined reduced power state is the DevSleep reduced power state, the predetermined command signal may correspond to the known "DEVSLP" signal defined in the Device Sleep specification, and the host computer 104 may assert the DEVSLP signal to the controller 110 on the line optional 107, using out-of-band signaling. The controller 110 receives the predetermined command signal from the host computer 104, and executes the command to cause the SSD 102 to enter the predetermined reduced power state.

Upon entering the reduced power state of the SSD, the SSD controller 106 on the first power island 140.1 can transfer the context information for the SSD 102 from the memory buffer 112 to, e.g., the page buffer 128.1 of the NAND flash memory 126.1 within the NAND flash package 108.1 on the second power island 140.2. To that end, the memory arbiter 120 directs the context information from the memory buffer 112 to the page buffer 128.1 via the channel 122.1. Further, the ECC encoder 124.1 within the channel 122.1 encodes the context information to provide a desired level of ECC before the context information is stored in the page buffer 128.1. It is noted that the SSD controller 106 can transfer such context information for the SSD 102 from the memory buffer 112, other SRAM or DRAM internal or external to the SSD controller 106, one or more registers internal to the SSD controller 106, and/or any other suitable memory, register, or storage location internal or external to the SSD controller 106. It is further noted that such context information for the SSD 102 can include computed values that are generated as part of the transition to low power operation.

Figure 2A:
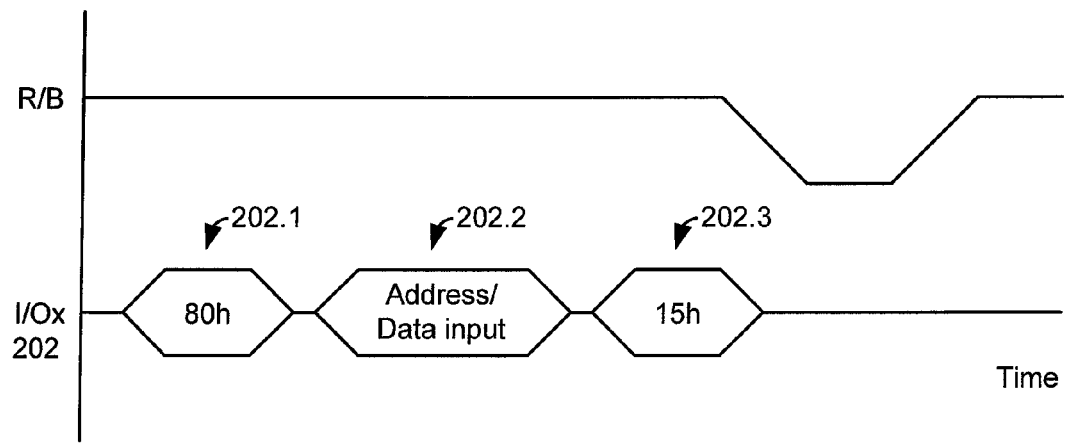
FIG. 2a is a timing diagram illustrating an exemplary program command op-code sequence that may be employed by the solid-state storage device of FIG. 1 for storing context information in a page buffer of flash memory.

In this example, the SSD controller 106 is configured to store the context information for the SSD 102 in the page buffer 128.1 of the NAND flash package 108.1 using a predetermined program command op-code that avoids programming the context information into the NAND flash memory 126.1. FIG. 2a depicts an exemplary program command op-code sequence (I/Ox) 202 that may be employed by the SSD controller 106 for storing the context information in the page buffer 128.1. As shown in FIG. 2a, the program command op-code sequence 202 includes an exemplary SERIAL DATA INPUT command 202.1 (e.g., 80h) followed by exemplary ADDRESS cycles (e.g., 5)/DATA INPUT (e.g., the context information) 202.2 and an exemplary CACHE WRITE command 202.3 (e.g., 15h). For example, the program command op-code sequence (I/Ox) 202 may correspond to a sequence for implementing the PROGRAM PAGE CACHE MODE of the Micron NAND flash memory, or any other suitable command op-code sequence. FIG. 2a further depicts an accompanying cache ready/busy (R/B) signal.

Once the context information for the SSD 102 is stored in the page buffer 128.1, the NAND flash memory 126.1 within the NAND flash package 108.1 on the second power island 140.2 is allowed to enter a standby mode, during which the host computer 104 is not in communication with the controller 110. In addition, the power manager 150 places the SSD controller 106 on the first power island 140.1 in a predefined low power mode, and disables power to the NAND flash packages 108.2-108.n as well as any other unneeded components on the first power island 140.1. For example, to place the SSD controller 106 in the predefined low power mode, the power manager 150 may disable power to the controller 110, the memory buffer 112, the processor 114, the ECC decoder 118, the memory arbiter 120, and the channels 122.1-122.n, including the ECC encoders 124.1-124.n.

It is noted, however, that the power manager 150 does not disable power to at least the control logic circuitry 116 within the SSD controller 106. The is because the control logic circuitry 116 is configured to detect a wakeup condition of the SSD 102, or the enabling of power to the components on the first power island 140.1 previously disabled by the power manager 150. For example, the control logic circuitry 116 may detect a wakeup condition in response to a wakeup request, which may be generated by a source either internal or external to the SSD 102. In one embodiment, the wakeup request may be generated by the power manager 150. In a further embodiment, the wakeup request may be generated in response to a keyboard input, a cursor input, a pushbutton input, a touch screen input, an input generated in response to the opening of a laptop lid, or any other suitable input.

Upon detection, by the control logic circuitry 116, of a wakeup condition or the enabling of power to the components on the first power island 140.1, the SSD controller 106 exits its predefined low power mode, the power manager 150 enables power to the NAND flash packages 108.2-108.n and the other components on the first power island 140.1, as required, and the NAND flash memory 126.1 within the NAND flash package 108.1 on the second power island 140.2 exits its standby mode. The SSD controller 106 then reads the context information for the SSD 102 from the page buffer 128.1, and restores and/or updates the context information in a system initialization process, as required.

Figure 2B:
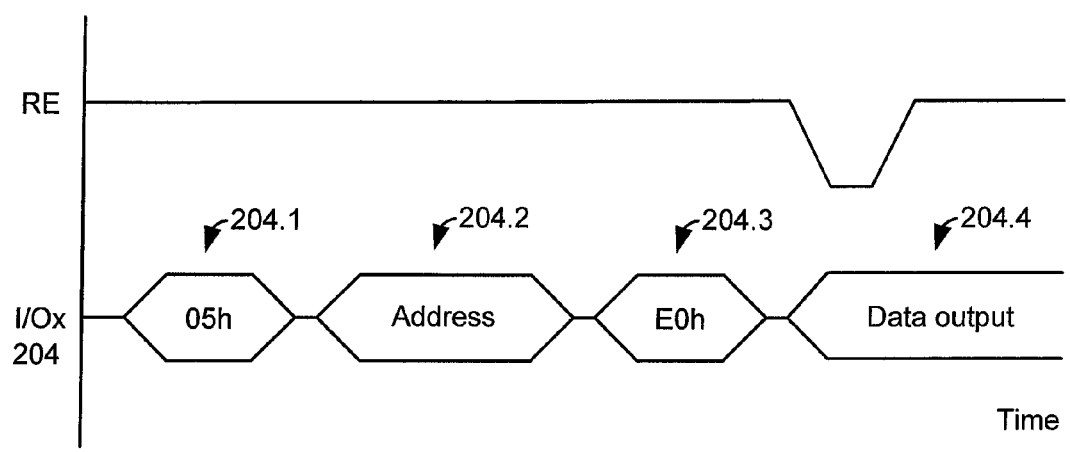

In this example, the SSD controller 106 is configured to read the context information for the SSD 102 from the page buffer 128.1 of the NAND flash package 108.1 using a predetermined read command op-code that allows the context information to be read directly from the page buffer 128.1. FIG. 2b depicts an exemplary read command op-code sequence (I/Ox) 204 that may be employed by the SSD controller 106 for reading the context information from the page buffer 128.1. As shown in FIG. 2b, the read command op-code sequence 204 includes an exemplary RANDOM DATA READ command 204.1 (e.g., 05h) followed by exemplary ADDRESS cycles (e.g., 2) 204.2, an exemplary PAGE READ command 204.3 (e.g., E0h), and the DATA OUTPUT 204.4 (e.g., the context information). For example, the read command op-code sequence 204 may correspond to a sequence for implementing the RANDOM DATA READ operation of the Micron NAND flash memory, or any other suitable command op-code sequence. FIG. 2b further depicts an accompanying read enable (RE) signal.

Having read the context information from the page buffer 128.1, the SSD controller 106 transfers the context information to the ECC decoder 118 via the channel 122.1 and the memory arbiter 120. The ECC decoder 118 decodes the context information, checks ECC parity for any data errors, and, if any such data errors exist, corrects the data errors before the SSD controller 106 stores the context information in the memory buffer 112, and/or any other suitable memory, register, or storage location internal or external to the SSD controller 106, to resume normal operation of the SSD 102.

Figure 3A:
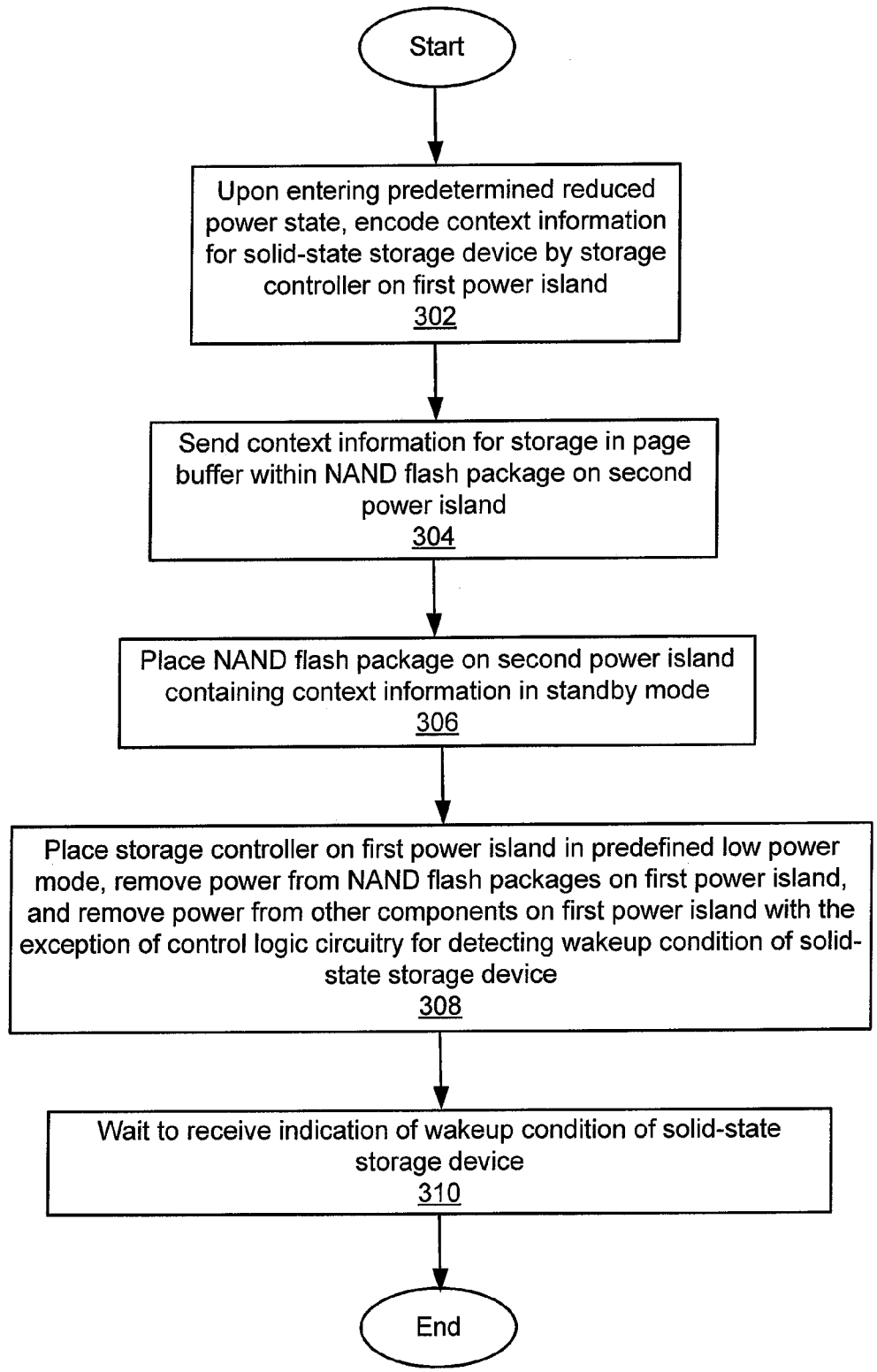
FIG. 3a is a flow diagram illustrating an exemplary method of operating the solid-state storage device of FIG. 1, upon entering an exemplary reduced power state.

An exemplary method of operating the disclosed apparatus for reducing power consumption in solid-state storage devices, upon entering a predetermined reduced power state, is described below with reference to FIG. 3*a*. In the disclosed apparatus, a solid-state storage device includes a storage controller and zero, one, or more NAND flash packages associated with a first power island, and at least one NAND flash package associated with a second power island. As depicted in block 302, upon entering the predetermined reduced power state, context information for the solid-state storage device is encoded by the storage controller on the first power island. As depicted in block 304, the context information for the solid-state storage device is sent by the storage controller for storage in a page buffer within the NAND flash package on the second power island. As depicted in block 306, the NAND flash package on the second power island containing the context information is placed in a standby mode. As depicted in block 308, the storage controller on the first power island is placed in a predefined low power mode, power is removed from the NAND flash packages on the first power island, and power is removed from other components on the first power island with the exception of control logic circuitry for detecting a wakeup condition of the solid-state storage device. As depicted in block 310, the control logic circuitry waits to receive an indication of the wakeup condition of the solid-state storage device.

Figure 3B:
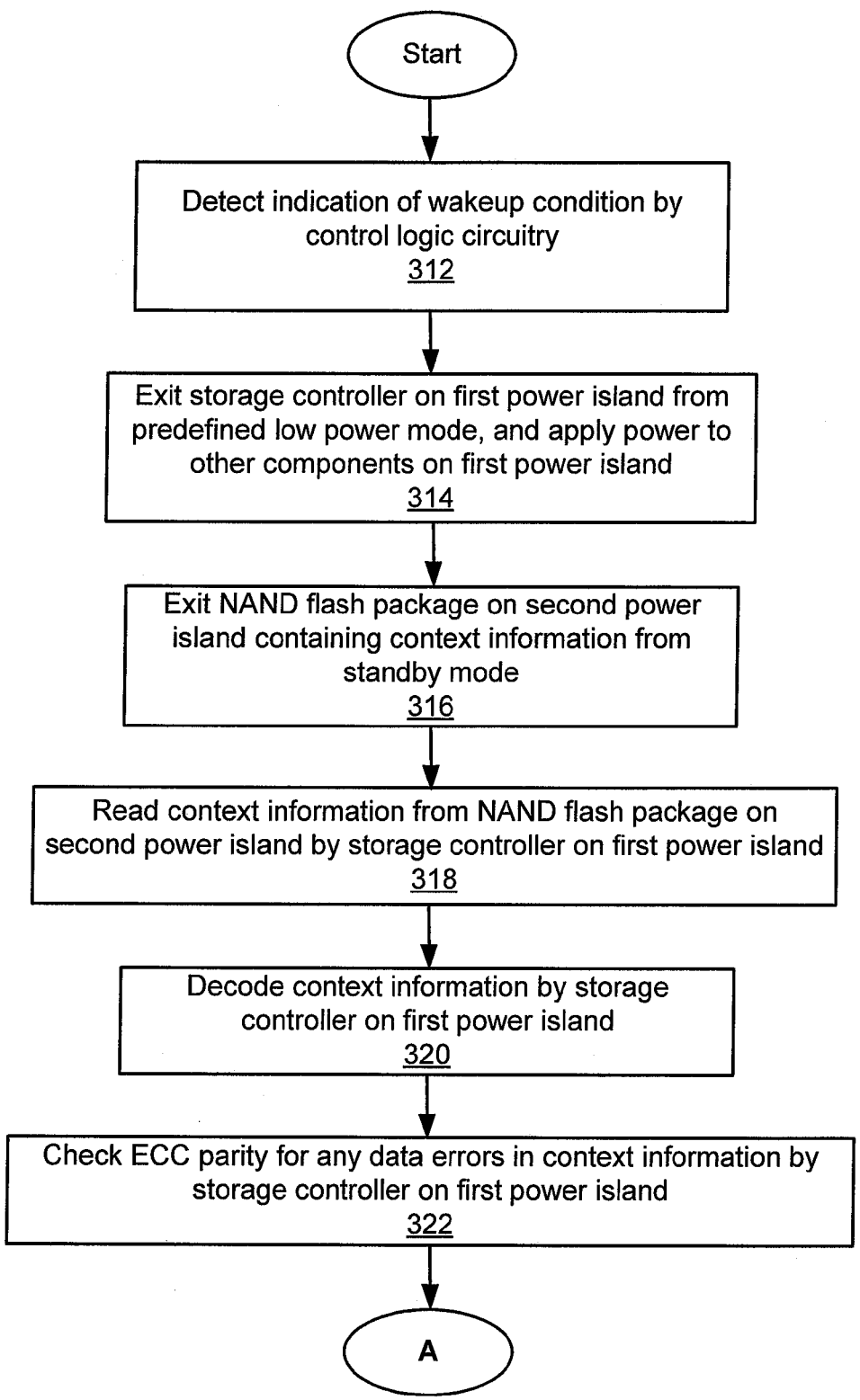
Figure 3B:
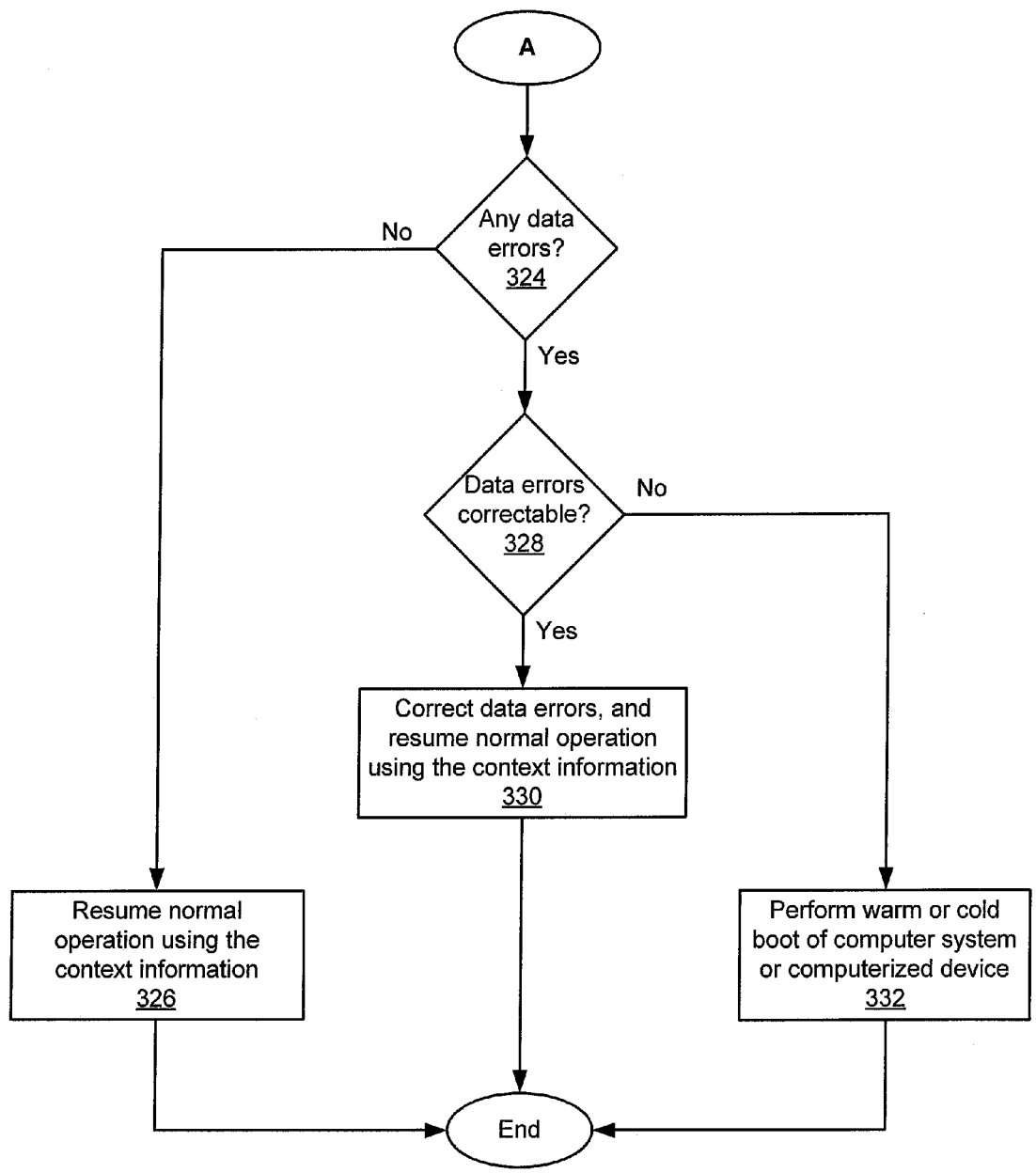

An exemplary method of operating the disclosed apparatus for reducing power consumption in solid-state storage devices, upon exiting the predetermined reduced power state, is described below with reference to FIG. 3*b*. As depicted in block 312, an indication of the wakeup condition is detected by the control logic circuitry. As depicted in block 314, the storage controller on the first power island exits the predefined low power mode, and power is applied to the other components on the first power island. As depicted in block 316, the NAND flash package on the second power island containing the context information exits the standby mode. As depicted in block 318, the context information is read from the NAND flash package on the second power island by the storage controller on the first power island. As depicted in block 320, the context information is decoded by the storage controller on the first power island. As depicted in block 322, ECC parity is checked for any data errors in the context information by the storage controller on the first power island. As depicted in block 324, a determination is made as to whether the context information contains any data errors. As depicted in block 326, in the event there are no data errors in the context information, the solid-state storage device resumes normal operation using the context information. As depicted in block 328, in the event there are data errors in the context information, a determination is made as to whether or not the data errors are correctable. As depicted in block 330, in the event the data errors are correctable, the data errors are corrected, and the solid-state storage device resumes normal operation using the context information. As depicted in block 332, in the event the data errors are not correctable, a warm or cold boot of a computer system or computerized device containing the solid-state storage device is performed.

Having described the above exemplary embodiments of the disclosed apparatus and methods, other alternative embodiments or variations may be made. For example, it was described herein that, upon entering a reduced power state of the SSD 102 (see FIG. 1), context information for the SSD 102 can be stored in the page buffer 128.1 of the NAND flash memory 126.1 within the NAND flash package 108.1. In an alternative embodiment, upon entering the reduced power state of the SSD 102, storage of the context information for the SSD 102 may be distributed between one or more of the respective page buffers 128.1-128.*p* of the NAND flash memory 126.1, on-chip SRAM (e.g., the memory buffer 112) within the SSD controller 106, and/or off-chip SRAM or dynamic random access memory (DRAM) (e.g., the DRAM 130).

It was further described herein that the host computer 104 can enable the SSD 102 to enter a predetermined reduced power state using the ATA SET FEATURES command, as defined in the SATA specification, and, at a time when there are no other commands outstanding, transmit the ATA SET FEATURES command to the SSD 102 over the system bus 105 implemented as a SATA bus. In an alternative embodiment, the system bus 105 may be implemented as a Peripheral Component Interconnect express (PCIe) bus, and the SSD 102 may be configured to conform to the NVM Express specification, Revision 1.1, Oct. 11, 2012, or latest revision.

The foregoing description of exemplary embodiments is provided for purposes of illustration, and is not intended to be exhaustive or to limit the application to the precise form disclosed. Modifications and variations are possible in light of the teachings herein, or may be acquired from practice of the claimed invention. For example, while a series of operations has been described herein with reference to FIGS. 3*a* and 3*b*, the order of the operations may be modified in other implementations. Further, non-dependent operations may be performed in parallel.

It will be apparent that one or more embodiments described herein may be implemented in many different forms of software and/or hardware. Software code and/or specialized hardware used to implement embodiments described herein is not limiting of the claimed invention. Thus, the operation and behavior of some embodiments were described herein without reference to the specific software code and/or the specialized hardware, it being understood that one of ordinary skill in the art would be able to design software and/or hardware to implement the embodiments based on the description herein.

Figure 4:
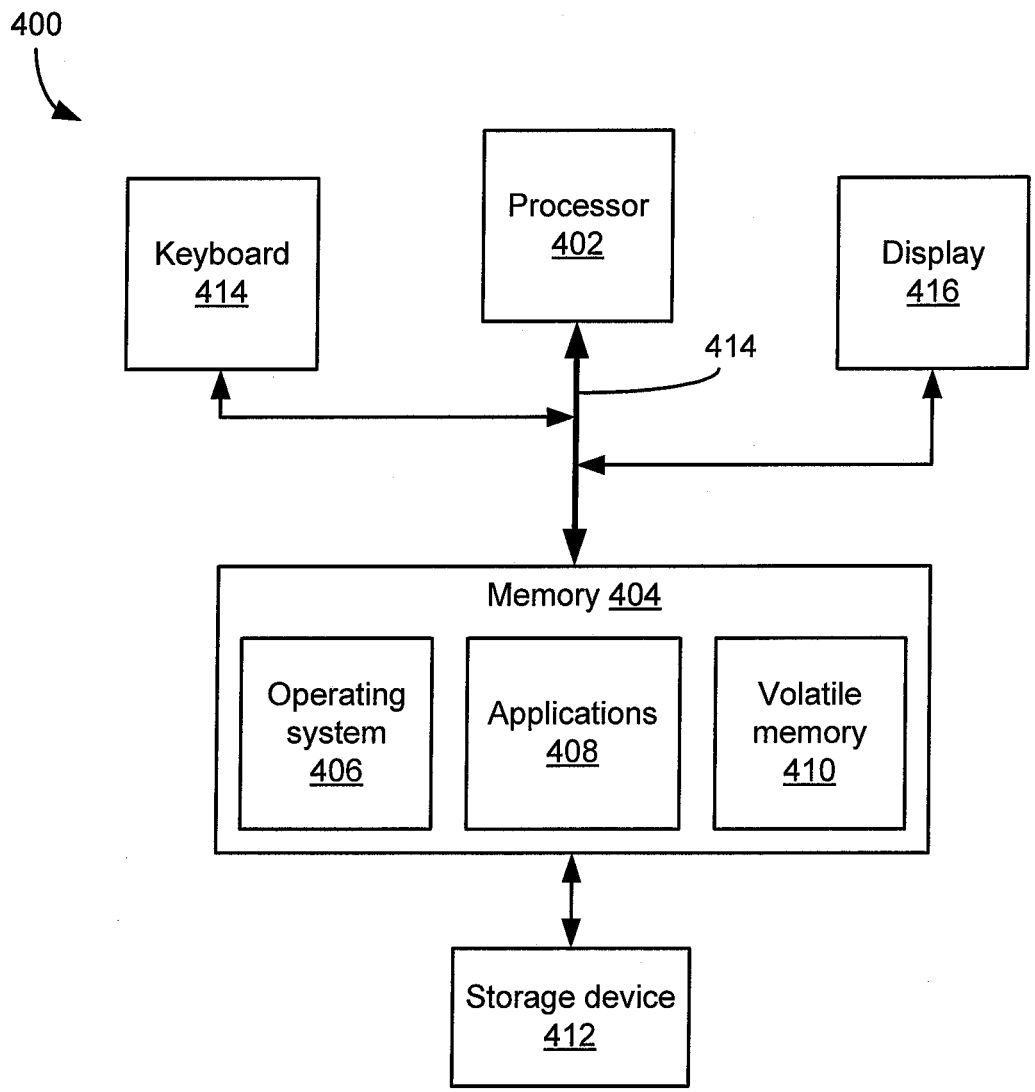
FIG. 4 is a block diagram of a further exemplary computer system operative to implement methods of operating the solid-state storage device of FIG. 1.

Further, certain features of the claimed invention may be implemented using computer-executable instructions that may be executed by a processor or processing logic. FIG. 4 depicts a further exemplary computer system 400 that can be configured to implement systems and methods of the claimed invention. As shown in FIG. 4, the computer system 400 can include at least one processor 402 communicably coupled to a keyboard 414, a display 416, and at least one memory 404 by a system bus 414, as well as at least one storage device 412 such as an SSD. For example, the computer system 400 can be any suitable type of resource such as a personal computer, a cellular telephone, a mobile device, a camera, etc., using memory to store data. The processor 402 is operative to execute instructions stored on at least one non-transitory storage medium, such as the memory 404 or any other suitable storage medium, for performing various processes within the computer system 400, including one or more processes for controlling operations of the memory 404 and/or the storage device 412. The memory 404 can include one or more memory components such as a volatile memory 410, which may be implemented as static random access memory (SRAM), dynamic random access memory (DRAM), or any other suitable volatile memory. The memory 404 can also be configured to store an operating system 406 executable by the processor 402, and one or more applications 408 that may be run by the operating system 406. In response to a request generated by one of the applications 408, the processor 402 can execute the operating system 406 to perform data write/read operations on the volatile memory 410 and/or the storage device 412.

It is noted that FIG. 4 illustrates an exemplary embodiment of the computer system 400, and that other embodiments of the computer system 400 may include more apparatus components, or fewer apparatus components, than the apparatus components illustrated in FIG. 4. Further, the apparatus components may be arranged differently than as illustrated in FIG. 4. For example, in some embodiments, the storage device 412 may be located at a remote site accessible to the computer system 400 via the Internet, or any other suitable network. In addition, functions performed by various apparatus components contained in other embodiments of the computer system 400 may be distributed among the respective components differently than as described herein.

No element, operation, or instruction employed herein should be construed as critical or essential to the application unless explicitly described as such. Also, as employed herein, the article "a" is intended to include one or more items. Where only one item is intended, the term "one" or similar language is employed. Further, the phrase "based on" is intended to mean "based, at least in part, on" unless explicitly stated otherwise.

It is intended that the invention not be limited to the particular embodiments disclosed herein, but that the invention will include any and all particular embodiments and equivalents falling within the scope of the following appended claims.

What is claimed is:

1. A method of reducing power consumption in a solid-state storage device, comprising:
providing a storage controller and a plurality of non-volatile memory packages, the storage controller and zero or more of the non-volatile memory packages being arranged on a first power island, and at least one of the non-volatile memory packages being arranged on a second power island;
upon entering a predetermined reduced power state of the solid-state storage device, storing, by the storage controller, context information for the solid-state storage device in at least one memory buffer within the non-volatile memory package on the second power island, and removing power from at least the non-volatile memory packages on the first power island; and
once the context information is stored in the memory buffer within the non-volatile memory package on the second power island, placing the non-volatile memory package on the second power island in a standby mode, and placing the storage controller on the first power island in a predefined low power mode.

2. The method of claim 1 further comprising:
in response to a predetermined event, exiting the storage controller from the predefined low power mode, and exiting the non-volatile memory package on the second power island from the standby mode.

3. The method of claim 2 further comprising:
applying power to the non-volatile memory packages on the first power island.

4. The method of claim 2 further comprising:
reading, by the storage controller, the context information from the memory buffer within the non-volatile memory package on the second power island.

5. The method of claim 4 further comprising:
storing, by the storage controller, the context information in volatile memory associated with the storage controller.

6. The method of claim 1 further comprising:
encoding, by an error checking and correction (ECC) encoder, the context information prior to storing the context information in the memory buffer within the non-volatile memory package on the second power island.

7. The method of claim 6 further comprising:
in response to a predetermined event, exiting the storage controller from the predefined low power mode, and exiting the non-volatile memory package on the second power island from the standby mode; and
reading, by the storage controller, the context information from the memory buffer within the non-volatile memory package on the second power island.

8. The method of claim 7 further comprising:
decoding the context information by an ECC decoder.

9. The method of claim 1 wherein the storing of the context information for the solid-state storage device includes storing some of the context information in volatile memory associated with the storage controller.

10. An apparatus for reducing power consumption in a solid-state storage device, comprising:
a storage controller;
a plurality of non-volatile memory packages,
wherein the storage controller and zero or more of the non-volatile memory packages are arranged on a first power island, and at least one of the non-volatile memory packages is arranged on a second power island; and
a power manager,
wherein, upon entering a predetermined reduced power state of the solid-state storage device:
the storage controller is operative to store context information for the solid-state storage device in at least one memory buffer within the non-volatile memory package on the second power island; and
the power manager is operative to remove power from at least the non-volatile memory packages on the first power island, and
wherein, once the context information is stored in the memory buffer within the non-volatile memory package on the second power island:
the non-volatile memory package on the second power island is operative to enter a standby mode, and
the storage controller on the first power island is operative to enter a predefined low power mode.

11. The apparatus of claim 10 wherein, in response to a predetermined event:
the storage controller is further operative to exit from the predefined low power mode, and
the non-volatile memory package on the second power island is further operative to exit from the standby mode.

12. The apparatus of claim 11 wherein the power manager is further operative to apply power to the non-volatile memory packages on the first power island.

13. The apparatus of claim 11 wherein the storage controller is further operative to read the context information from the memory buffer within the non-volatile memory package on the second power island.

14. The apparatus of claim 13 wherein the storage controller is further operative to store the context information in volatile memory associated with the storage controller.

15. The apparatus of claim 10 further comprising:
an error checking and correction (ECC) encoder operative to encode the context information prior to the context information being stored in the memory buffer within the non-volatile memory package on the second power island.

16. The apparatus of claim 15:
wherein, in response to a predetermined event, the storage controller is further operative to exit from the predefined low power mode, and the non-volatile memory package on the second power island is further operative to exit from the standby mode; and
wherein the storage controller is further operative to read the context information from the memory buffer within the non-volatile memory package on the second power island.

17. The apparatus of claim 16 further comprising an ECC decoder operative to decode the context information.

18. The apparatus of claim 10 wherein the storage controller is further operative to store some of the context information in volatile memory associated with the storage controller.

19. A computer system, comprising:
a system bus;
a display communicably coupled to the system bus;
the apparatus of claim 10 communicably coupled to the system bus; and
at least one volatile memory coupled to the system bus.

20. The system of claim 19 wherein the apparatus is operative to store some of the context information in the volatile memory.

* * * * *